(12) United States Patent
Kamiyama et al.

(10) Patent No.: US 7,278,383 B2
(45) Date of Patent: Oct. 9, 2007

(54) INTERNAL COMBUSTION ENGINE WITH VARIABLE COMPRESSION RATIO AND VALVE CHARACTERISTICS

(75) Inventors: Eiichi Kamiyama, Mishima (JP); Daisuke Akihisa, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/589,173

(22) Filed: Oct. 30, 2006

(65) Prior Publication Data

US 2007/0095313 A1    May 3, 2007

(30) Foreign Application Priority Data

Oct. 31, 2005    (JP)    ............... 2005-316674

(51) Int. Cl.
F02B 75/04    (2006.01)
F02D 13/00    (2006.01)
F01L 1/34    (2006.01)

(52) U.S. Cl. ............... 123/48 C; 123/78 C; 123/90.15; 123/345

(58) Field of Classification Search ............. 123/90.11, 123/90.15, 90.16, 445–448, 48 C, 78 C
See application file for complete search history.

(56) References Cited

U.S. PATENT DOCUMENTS 6,915,766 B2 *    7/2005    Aoyama et al. .......... 123/78 E 6,932,054 B2 *    8/2005    Kikori ................ 123/347

FOREIGN PATENT DOCUMENTS

| JP | A 2001-263099 | | 9/2001 |
| JP | A 2004-218551 | | 8/2004 |
| JP | A 2005-83238 | | 3/2005 |
| JP | 2005-106020 | * | 4/2005 |
| JP | 2005-180303 | * | 7/2005 |

* cited by examiner

*Primary Examiner*—Hai Huynh
(74) *Attorney, Agent, or Firm*—Kenyon & Kenyon LLP

(57) ABSTRACT

When controlling the valve characteristics of an intake valve and changing the compression ratio, an upper variation limit compression ratio, which is the upper limit of the variation of compression ratio, is determined according to the actual valve characteristics of the intake valve characteristics control. The upper variation limit compression ratio is set to a valve at which the intake valve does not collide with the piston. When a target compression ratio corresponding to the operation state of the engine is larger than the upper variation limit compression ratio, the compression ratio is set to the upper variation limit compression ratio that is smaller than the target compression ratio. Thus, collision between the intake valve and the piston can be prevented while allowing the compression ratio to be increased up to the maximum compression ratio of the range where the collision does not occur.

19 Claims, 9 Drawing Sheets

INTERNAL COMBUSTION ENGINE WITH VARIABLE COMPRESSION RATIO AND VALVE CHARACTERISTICS

INCORPORATION BY REFERENCE

The disclosure of Japanese Patent Application No. 2005-316674 filed on Oct. 31, 2005, including the specification, drawings and abstract is incorporated herein by reference in its entirety.

BACKGROUND OF THE INVENTION

1. Field of the Invention

The invention relates to an internal combustion engine in which the compression ratio and valve characteristics are variable.

2. Description of the Related Art

In recent years, various controls for controlling internal combustion engines have been proposed and employed to further improve the engine efficiency. The engine efficiency improves, for example, when the charging efficiency of air-fuel mixtures improves and when the compression ratio at which fuel is burned increases. Thus, it has been proposed to variably control the compression ratio in a combustion chamber, as well as the valve characteristics of the intake and exhaust valves, on the basis of the operation state of the internal combustion engine.

However, as the compression ratio increases as a result of such compression ratio control, the top dead center of the piston approaches the valves. Therefore, in a certain state of the valve characteristics control, the piston and the valves may collide with each other when the piston is at or close to the top dead center. Thus, solutions for preventing such collision between a piston and valves have been sought (for example, refer to Japanese Patent Application Publications No. JP-A-2001-263099 and No. JP-A-2005-83238).

Japanese Patent Application Publication No. JP-A-2001-263099 describes a method for avoiding collision between a valve and a piston, in which, when the compression ratio is made high during the compression ratio control, the timing at which the intake valve is retarded and/or the lift of the intake valve is reduced in order to create a clearance between the intake valve and the piston to prevent collision therebetween. Meanwhile, Japanese Patent Application Publication No. JP-A-2005-83238 describes a method for avoiding collision between a valve and a piston, in which the compression ratio is reduced towards the minimum compression ratio of the variation range of compression ratio in order to increase the distance between the top dead center of the piston and the valve and thereby prevent collision between the valve and the piston.

According to theses methods, however, it is considered that the following problems may occur when the above-stated controls are being implemented to prevent collision between the piston and the valve. Specifically, regarding the former method, when the valve lift of the intake valve is reduced and/or the valve timing of the intake valve is retarded to prevent collision with the piston, the charge efficiency of air-fuel mixture may decrease and thus the engine efficiency. Regarding the latter method, when the compression ratio is reduced towards the minimum compression ratio to prevent collision between the piston and the valve, the temperature of air-fuel mixture may not sufficiently increase, which reduces the fuel economy.

SUMMARY OF THE INVENTION

It is an object of the invention to prevent collision between a piston and a valve (intake or exhaust valve) when valve characteristics control of the valve and compression ratio control are performed, and thereby improve the engine efficiency and the fuel economy when collision between the valve and the piston is being avoided.

A first aspect of the invention relates to an internal combustion engine including: a combustion chamber; a piston; an intake valve; an exhaust valve; a variable compression ratio mechanism that changes a compression ratio by changing a capacity of the combustion chamber; a compression ratio control portion that controls the variable compression ratio mechanism so as to achieve a target compression ratio determined according to an operation state of the internal combustion engine; a variable valve characteristics mechanism that changes valve characteristics of at least one of the intake valve and the exhaust valve; a variable valve control portion that controls the variable valve characteristics mechanism so as to achieve target valve characteristics of the at least one of the intake valve and the exhaust valve that are determined according to an operation state of the internal combustion engine; and a compression ratio limit portion that determines an upper variation limit compression ratio that is an upper limit of compression ratio at which the at least one of the intake valve and the exhaust valve does not collide with the piston, according to actual valve characteristics of the at least one of the intake valve and the exhaust valve that are realized by the variable valve characteristics mechanism being controlled by the variable valve control portion, and limits the target compression ratio to the upper variation limit compression ratio when the target compression ratio is larger than the upper variation limit compression ratio.

According to the invention, the following advantages are achieved.

Here, it is assumed that a valve (referred to as "controlled valve") is operating according to the valve characteristics realized by a variable valve characteristics mechanism (referred to as "realized valve characteristics") in a situation where collision between the controlled valve and a corresponding piston may occur depending on the state of the controlled valve operating according to the realized valve characteristics or the result of the control of the variable compression ratio control mechanism that is performed to achieve the target compression ratio determined according to the operation state of the internal combustion engine. Under such circumstance, in the internal combustion engine according to the invention, the upper variation limit compression ratio, which is the upper limit of compression ratio at which the controlled valve does not collide with the piston, is determined according to the realized valve characteristics.

When the compression ratio is set to the upper variation limit compression ratio, the controlled valve may collide with the piston. Therefore, if the realized compression ratio is larger than the upper variation limit compression ratio, the controlled valve collides with the piston. If the realized compression ratio is equal to or smaller than the upper variation limit compression ratio, the controlled valve does not collide with the piston. Therefore, according to the invention having the aforementioned structure, when the target compression ratio exceeds the upper variation limit compression ratio, the target compression ratio is limited to or below the upper variation limit compression ratio, and the compression ratio control mechanism is controlled to achieve the upper variation limit compression ratio that is smaller than the target compression ratio, rather than the target compression ratio. This makes it possible to prevent the controlled valve operating with the realized valve characteristics from colliding with the piston. Furthermore, when the compression ratio is controlled in the above manner, the compression ratio can be increased up to the upper variation limit compression ratio at which the collision is avoided, even though the upper variation limit compression ratio is smaller than the target compression ratio. As a result, the fuel economy improves as well as the engine efficiency. In addition, when the target compression ratio is equal to or smaller than the upper variation limit compression ratio, the compression ratio control mechanism is controlled so as to achieve the target compression ratio. Therefore, even in this case, the controlled valve operating with the realized valve characteristics can be prevented from colliding with the piston, and the internal combustion engine can be operated at the target compression ratio. As a result, both of the engine efficiency and fuel economy improve.

In the above-described internal combustion engine may further have a valve characteristics limiting portion that limits a control of the valve characteristics of the at least one of the intake valve and the exhaust valve that is performed by the variable valve control portion when an operation failure of the at least one of the intake valve and the exhaust valve occurs, wherein the compression ratio limiting portion determines the upper variation limit compression ratio according to the valve characteristics determined by the limited control of the valve characteristics limiting portion when the valve characteristics limiting portion is limiting the control of the valve characteristics by the variable valve control portion.

A second aspect of the invention relates to a method for operating an internal combustion engine. This method includes: changing a compression ratio by changing a capacity of a combustion chamber so as to achieve a target compression ratio determined according to an operation state of the internal combustion engine; changing valve characteristics of at least one of an intake valve and an exhaust valve so as to achieve target valve characteristics determined according to an operation state of the internal combustion engine; determining an upper variation limit compression ratio that is an upper limit of compression ratio at which the at least one of the intake valve and the exhaust valve does not collide with a piston, according to the changed valve characteristics of the at least one of the intake valve and the exhaust valve; and limiting the target compression ratio to the upper variation limit compression ratio when the target compression ratio is larger than the upper variation limit compression ratio.

The invention relates to an internal combustion engine in which the compression ratio and the valve characteristics are variable, and also relates to the control method of such an internal combustion engine. The internal combustion engine according to the invention may be applied to vehicles, and may also be applied to various other movable units. The method for operating the internal combustion engine according to the invention may be realized in the form of a controller for controlling an internal combustion engine, a control method for controlling an internal combustion engine, a computer program that realizes the functions of the controller, and a recording medium storing the computer program, data signals carrying the computer program and embodied in carrier waves, and in various other forms.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIGS. 6A and 6B are views illustrating the upper variation limit compression ratio $\epsilon up$ determined according to the valve characteristics. FIG. 6 shows how the upper variation limit compression ratio $\epsilon up$ is determined in response to a change of the valve timing.

DETAILED DESCRIPTION OF THE EXEMPLARY EMBODIMENTS

Figure 1:
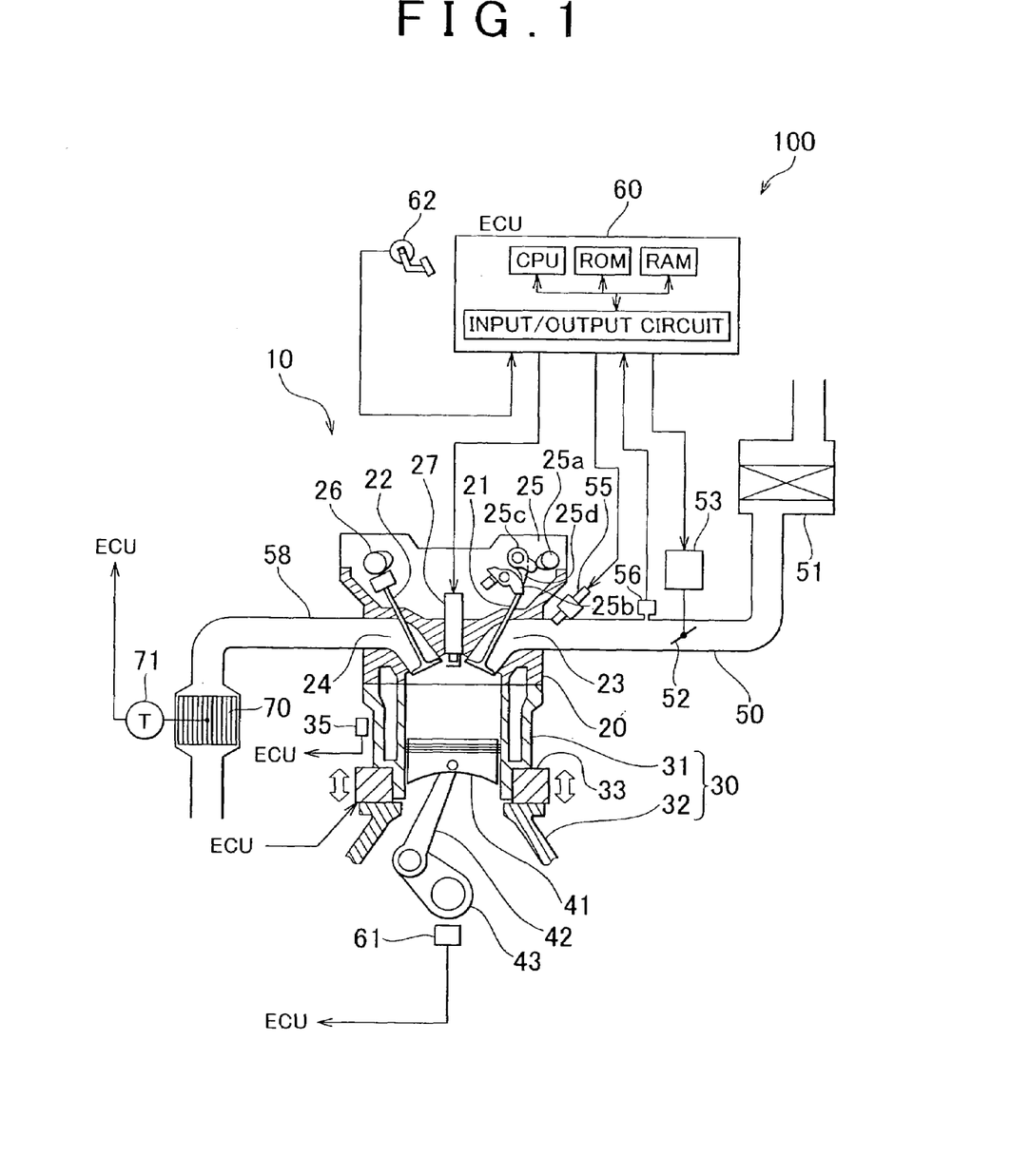
FIG. 1 is a view schematically showing the structure of a gasoline engine 100 in an embodiment.
Figure 2:
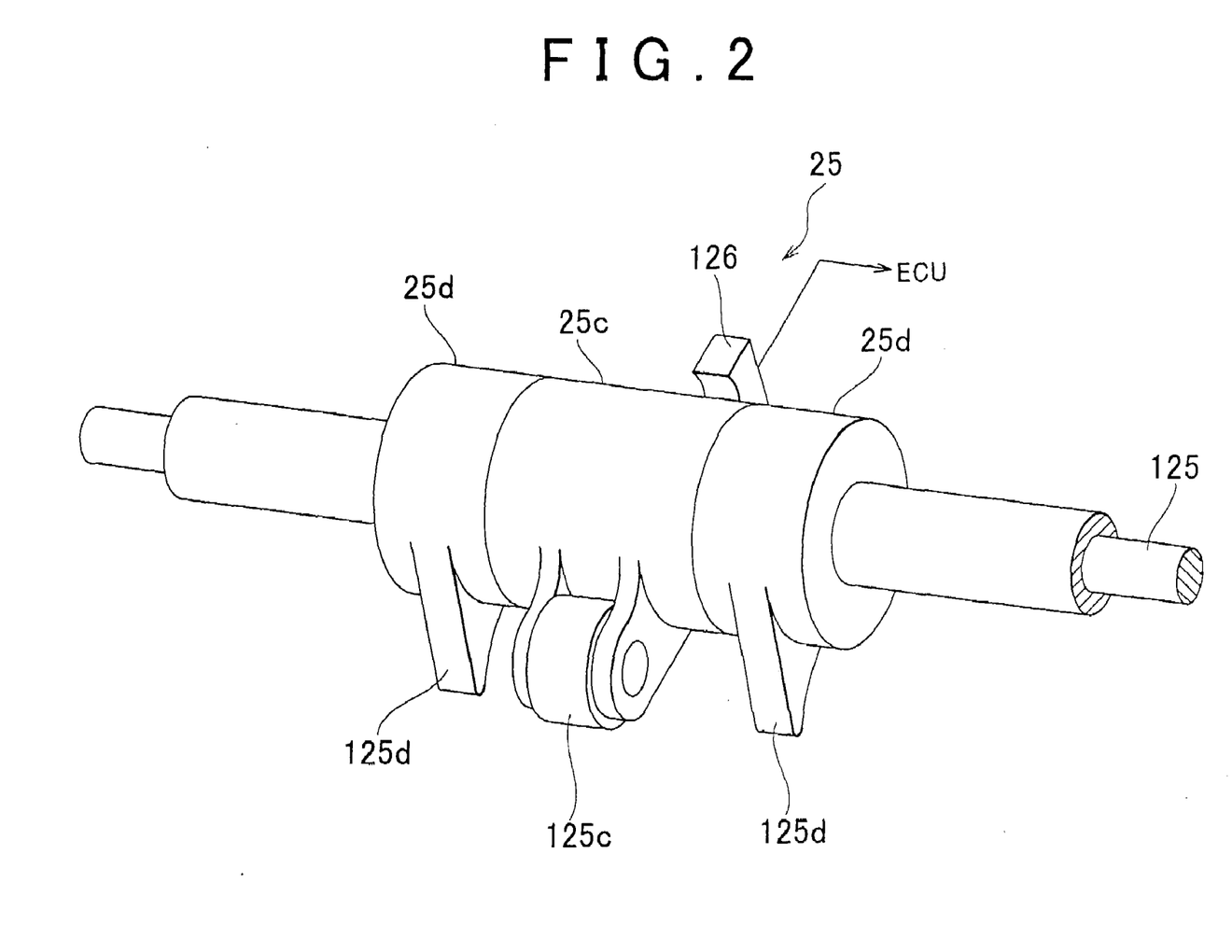
FIG. 2 is a view schematically illustrating the main portion of a cam mechanism that variably controls valve characteristics.

Exemplary embodiments of the invention will be described with reference to the drawings. FIG. 1 is a view schematically showing the construction of a gasoline engine 100 of the embodiment, and FIG. 2 is a view schematically showing the main portion of a cam mechanism that variably controls the valve characteristics. The engine in the embodiment is mounted on a vehicle.

A-1. Engine Structure:

The engine 100 includes an engine main unit 10, and the engine main unit 10 includes a cylinder head 20 and a cylinder block 30.

The cylinder block 30 includes an upper block 31 and a lower block 32. The upper block 31 serves as cylinders, and the lower block 32 serves as a crankcase. A piston 41 is provided in each of the cylinders, and a crankshaft 43 is provided in the crankcase. The piston 41 and the crankshaft 43 are connected to each other through a connecting rod 42 that converts the reciprocating motion of the piston 41 into the rotary motion of the crankshaft 43. The space surrounded by the cylinder head 20 and the cylinder block 30 serves a combustion chamber.

An actuator 33 is provided between the upper block 31 and the lower block 32. The actuator 33 moves the upper block 31 up and down with respect to the lower block 32. When the actuator 33 moves the upper block 31 upward, the cylinder head 21 accordingly goes up, increasing the capacity of the combustion chamber and thus decreasing the compression ratio. When the actuator 33 moves the upper block 31 downward, the cylinder head 20 accordingly goes down, reducing the capacity of the combustion chamber and thus increasing the compression ratio. As such, the upper block 31, the lower block 32, and the actuator 33 together constitute a variable compression ratio mechanism that changes the compression ratio by changing the capacity of the combustion chamber.

An intake port 23 and an exhaust port 24 are formed in the cylinder head 20. Intake valves 21 are provided in the intake port 23, and exhaust valves 22 are provided in the exhaust port 24. The intake valves 21 and the exhaust valves 22 are driven by valve drive mechanisms (cam mechanisms) 25, 26, respectively. The cam mechanism 25 will be described in detail later in the specification.

An intake pipe 50 is connected to the intake port 23, and an exhaust pipe 58 is connected to the exhaust port 24. A throttle valve 52 and a fuel injection valve 55 are provided in the intake pipe 50. Air is supplied from the upstream side of the intake pipe 50 through an air cleaner 51. The throttle valve 52 driven by an electric actuator 53 adjusts the amount of air taken into the combustion chamber. The fuel injection valve 55 injects fuel (gasoline) supplied from a fuel pump (not shown) into the intake port 23 (port injection), so that mixture of air and fuel is produced. The air-fuel mixture is then taken into the combustion chamber, after which a spark plug 27 produces an electric spark so that the air-fuel mixture is ignited and combusted. Exhaust gas produced by the combustion is discharged from the combustion chamber. A purification device 70 including a three-way catalyst that purifies exhaust gas is provided in the exhaust pipe 58. The purification device 70 is provided relatively close to the exhaust ports 24 so that exhaust gas that is initially produced after the start of engine operation is promptly purified.

In the embodiment, the cam mechanism 25 for the intake valves 21 is configured so as to variably control the valve characteristics of the intake valves 21 (the valve lift and timing). FIG. 2 shows the main portions of the cam mechanism 25. As seen in the drawing, a rocker cam 25c and input arms 25d are arranged between an intake cam 25a and a rocker arm 25b, and the rocker cam 25c and the input arms 25d are supported on a shaft such that the relative phase difference between the rocker cam 25c and the input arms 25d is variable. Note that two intake valves 21 and two exhaust valves 22 are provided in each cylinder of the engine main unit 10. Thus, in the cam mechanism 25, two input arms 25d are provided for the two intake valves 21, one at one side of one rocker cam 25c and the other at the other side, so that one input arm is provided for one intake valve. The cam mechanism 25 includes spline gears for the rocker cam 25c and the input arms 25d, respectively, which are formed around the axis of the rocker cam 25c and the input arms 25d. The spline gear for the rocker cam 25c is threaded in the opposite direction from those of the spline gears for the input arms 25d. The rocker cam 25c and the input arms 25d include helical splines that are provided around the axis of the rocker cam 25c and the input arms 25d and meshed with the aforementioned spline gears. Thus, as a shaft 125 is driven by an actuator (not shown) and the spline gears are driven thereby, the relative phase difference between the rocker cam 25c and the input arms 25d changes. Accordingly, for example, as the rocker cam 25c moves a cam roller 125c attached thereto clockwise and the input arms 25d moves arm portions 125d counterclockwise from the state shown in FIG. 2, the relative phase difference between the cam roller 125c and the arm portions 125d, which act on the intake cam 25a and the rocker arm 25c, respectively, changes. This is how the cam mechanism 25 changes the characteristics (i.e., valve lift and valve timing) of the intake valves 21 by changing the relative phase difference between the rocker cam 25c and the input arms 25d.

The engine 100 also includes an electrical control unit (ECU) 60 for controlling the engine. The ECU 60 includes a CPU, a ROM, a RAM, and input/output circuits, all mutually connected via a bus. The ECU 60 is connected to a crank angle sensor 61, an accelerator opening sensor 62, an intake air pressure sensor 56, a temperature sensor 71, a coolant temperature sensor 35, and a cam phase sensor 126 (as shown in FIG. 2), and so on. The crank angle sensor 61 is provided at the crankshaft 43, and the accelerator-opening sensor 62 is provided at the accelerator pedal. The intake air pressure sensor 56 is provided in the intake air pipe 50, and the temperature sensor 71 is provided in the purification device 70. The coolant temperature sensor 35 detects the temperature of the engine coolant, and the cam phase sensor 126 detects the aforementioned relative phase difference of the cam mechanism 25. The ECU 60 calculates various parameters used for controlling the engine, such as the crank angle, the required load, and the intake air amount, based on the outputs from these sensors. The ECU 60 also calculates the valve lift and the valve timing of the intake valves 21, which are the valve characteristics, based on the relative phase difference of the cam mechanism 25 and the crank angle. Then the ECU 60 controls the actuators 33, the fuel injection valve 55, the spark plug 27, and cam mechanism 25, etc. based on the detection results of the sensors and the calculated parameters. That is, the ECU 60, together with the aforementioned CPU and the programs that will be described later, serves as a compression ratio control portion and a variable valve control portion.

Figure 3:
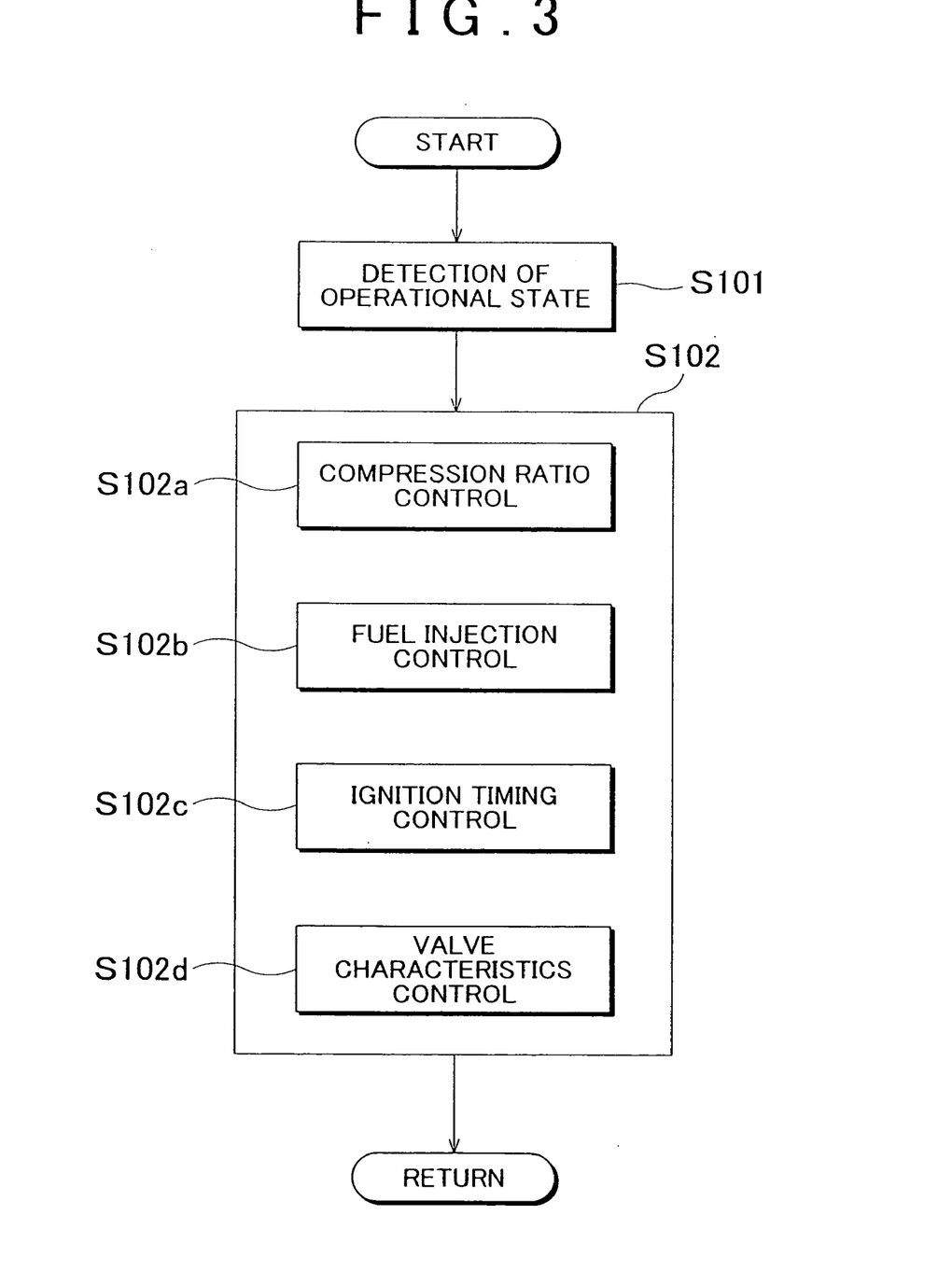
FIG. 3 is a flowchart showing the outline of engine control performed during normal operation of the engine.

A-2. Engine Control:

FIG. 3 is a flowchart showing the outline of the engine control performed when the engine is normally operating. Note that the ECU 60 repeatedly executes steps S 101 and S102.

In step S101, the operation state of the engine is detected. More specifically, the ECU 60 detects the characteristics (i.e., valve lift and valve timing) of the intake valves 21, as well as the engine speed and the required torque, to determine the operation state of the engine. The engine speed is determined based on the detection results from the crank angle sensor 61, and the required torque is determined based on the detection results from the accelerator-opening sensor 62. The valve characteristics are determined based on the detection results from the crank angle sensor 61 and the cam phase sensor 126.

In step S102, based on the operation state of the engine determined in step S101, various controls, which will be described below, are executed in parallel. In step S102a, the compression ratio is controlled. More specifically, in step S102a, the ECU 60 determines a target compression ratio based on the operation state of the engine (i.e., engine speed and required torque). Then, the ECU 60 controls the compression ratio of the engine by driving the actuator 33 so as to achieve the target compression ratio.

Figure 4:
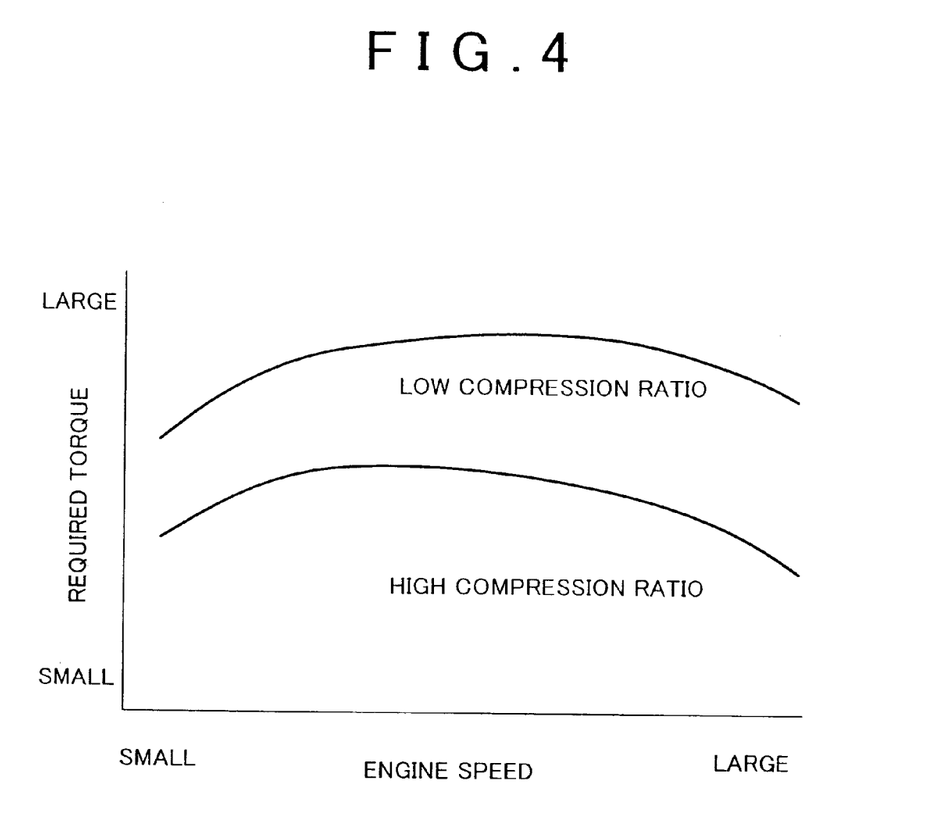
FIG. 4 is a view schematically showing a map defining the target compression ratio according to the operation state of the engine.

In the embodiment, the target compression ratio is determined using a map stored in the ROM of the ECU 60. FIG. 4 illustrates a map defining the target compression ratio that changes according to the operation state of the engine. As illustrated in FIG. 4, in the embodiment, when the required torque is small, the target compression ratio is set to a relatively high value. On the other hand, when the required torque is large, the target compression ratio is set to a relatively small value.

The compression ratio is controlled according to the operation state of the engine as described above. However, the compression ratio control is influenced by the control state of the valve characteristics of the intake valves 21, as will be described later.

In step S102*b*, the fuel injection is controlled based on the determined operation state of the engine. More specifically, the ECU 60 obtains the amount of intake air taken into the combustion chamber, and then determines the amount of fuel to be supplied based on the obtained intake air amount.

In the embodiment, the intake air amount is obtained based on the detection results from the intake air pressure sensor 56, and the fuel supply amount is determined so that the air-fuel ratio of air-fuel mixture equals a predetermined air-fuel ratio. In the embodiment, the predetermined air-fuel ratio is determined using a map defining the target air-fuel ratio that changes according to the operation state of the engine. The map is stored in the ROM of the ECU 60. Once the target air-fuel ratio is determined, the fuel supply amount is determined according to the intake air amount obtained as aforementioned. Fuel is then injected from the fuel injection valve 55 at an appropriate timing that is determined based on the detection results from the crank angle sensor 61.

In step S102*c*, the ignition timing is controlled according to the detected operation state of the engine. In the embodiment, the ignition timing is determined using a map defining the target ignition timing that changes according to the operation state of the engine. The map is stored in the ROM of the ECU 60. The spark plug 27 fires at an appropriate timing that is determined based on the detection results from the crank angle sensor 61.

In step S102*d*, the characteristics of the intake valves 21 are controlled according to the detected operation state of the engine. In the embodiment, the valve characteristics (i.e., valve lift and valve timing) are determined using a map defining the target valve characteristics that change according to the operation state of the engine. The map is stored in the ROM of the ECU 60. The intake valves 21 are driven according to the determined valve characteristics at an appropriate timing that is determined based on the detection results from the crank angle sensor 61. When the intake valves 21 are thus driven, the relative phase difference between the rocker cam 25*c* and the input arms 25*d*, which are arranged between the intake air cam 25*a* and the rocker arm 25*b*, is changed to increase or decrease as needed.

A-3. Compression Ratio Control Considering the Valve Characteristics:

Executing the aforementioned controls according to the operation state of the engine improves the operation efficiency and fuel economy of the engine 100. However, in spite of such advantages, the intake valves 21 and the piston 41 may collide with each other depending on how the intake valves 21 are operated. To avoid such collision, therefore, the compression ratio is controlled in the manner described below. FIG. 5 is a flowchart illustrating the procedure of a compression ratio control that addresses the valve characteristics of the intake valves 21.

Figure 5A:
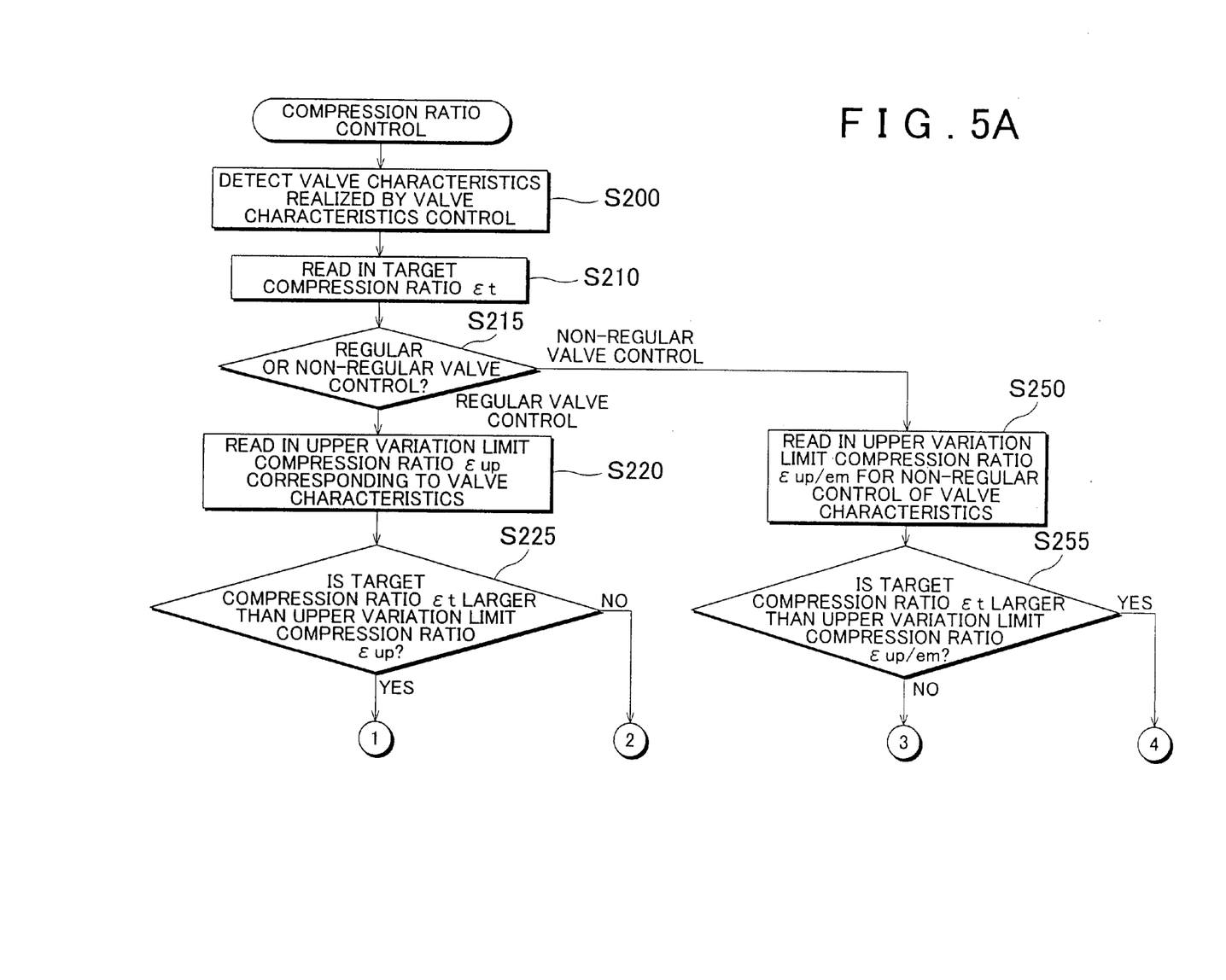
FIG. 5A and 5B are a flowchart illustrating the procedure for controlling the compression ratio in consideration of the valve characteristics.
Figure 5B:
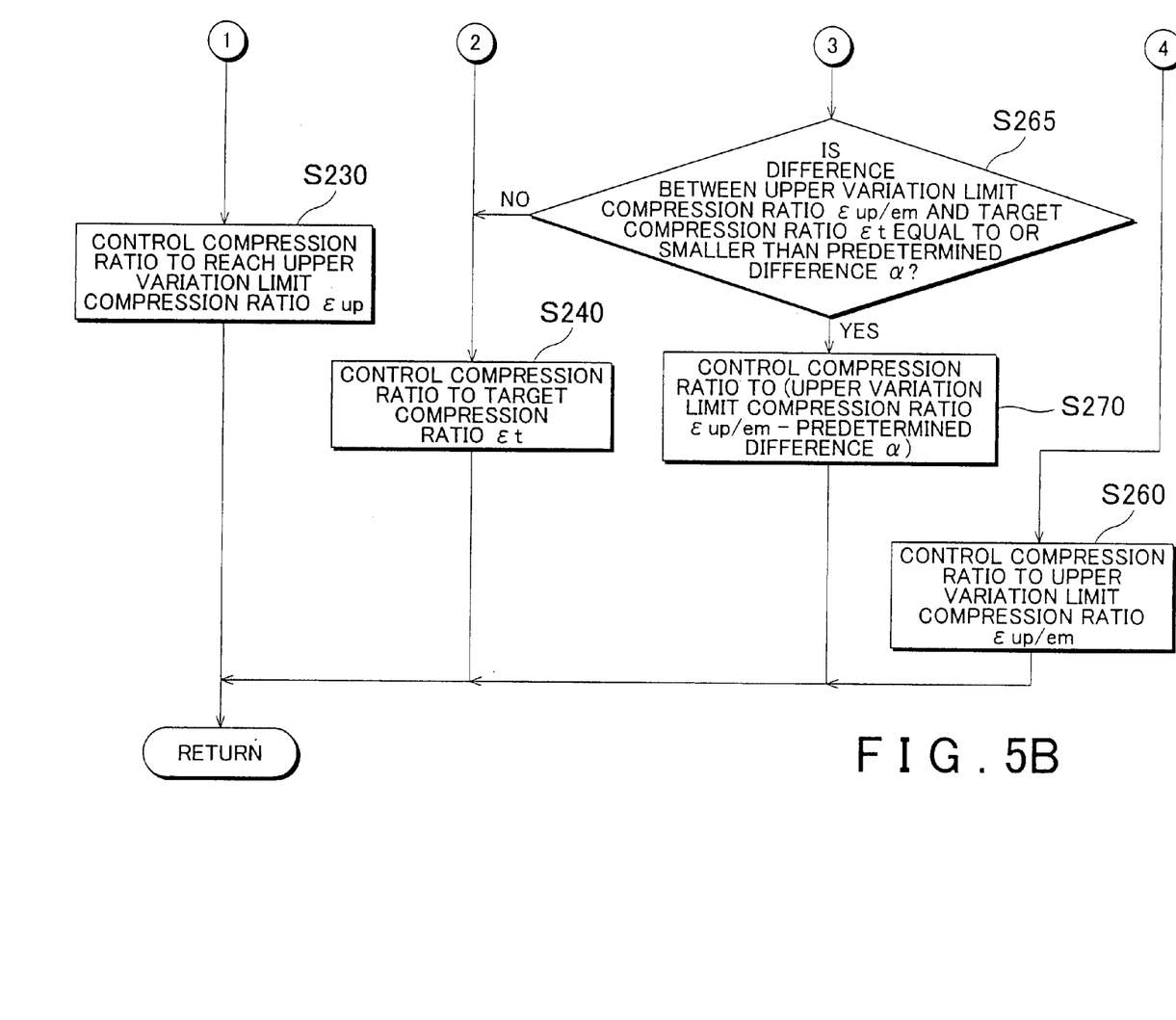

The ECU 60 repeatedly executes the control illustrated in FIG. 5A and 5B as a part of the compression ratio control performed in step S102*a* in FIG. 3. First, the actual valve characteristics of the intake valves 21 that are realized as a result of the valve characteristics control (step S102*d*) performed in parallel with other controls in step S102 are detected (step 200). Specifically, the actual valve characteristics of the intake valves 21 are detected based on the detection results from the crank sensor 61 and the cam phase sensor 126.

In step S210, the ECU 60 reads in a target compression ratio $\epsilon t$ corresponding to the present operation state of the engine (i.e., engine speed and required torque) from the map (shown in FIG. 4). Then, in step S215, the ECU 60 determines whether the valve characteristics control that is presently performed to control the engine operation is regular control or non-regular control (step S215). A hydraulic actuator is typically employed as the drive source of the cam mechanism 25 to change the relative phase difference between the rocker cam 25*c* and the input arms 25*d*. Since the viscosity of hydraulic fluid differs depending on its temperature being low or high, the fluid pressure differently acts on the actuator depending on the fluid temperature. Therefore, when the engine is started where the fluid temperature is low, non-regular valve characteristics control, such as the one that limits the variation range of the valve characteristics, is performed during a start-up valve control (not illustrated) in order to ensure a sufficient reliability in controlling the valve characteristics via the cam mechanism 25. Further, when there is a failure in the operation of the rocker cam 25*c* and the input arms 25*d* of the cam mechanism 25 for some reason, non-regular valve control, such as the one that fixes the valve characteristics to specific values or states, is performed during a valve fail-safe control.

Figure 6A:
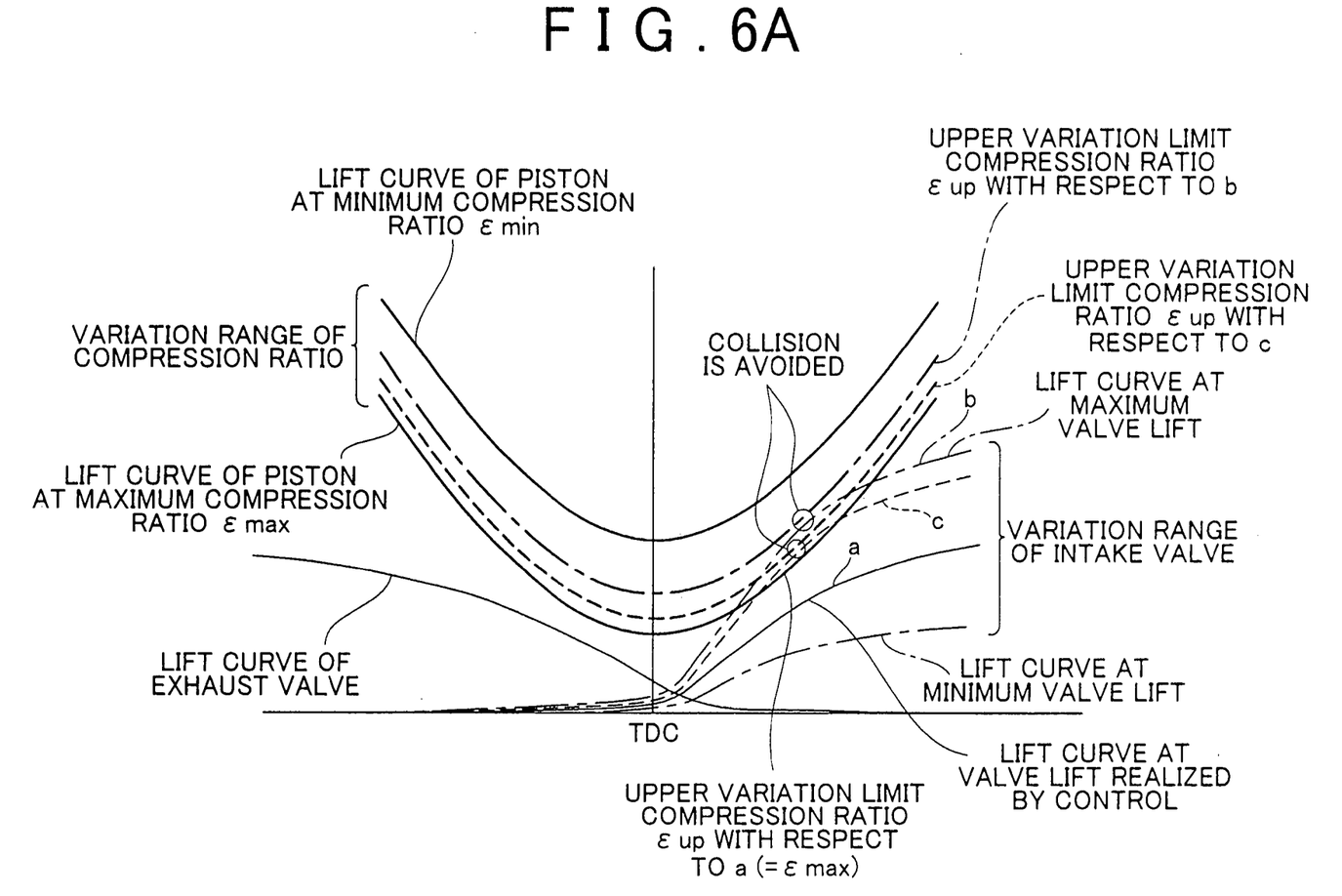
FIG. 6A shows how the upper variation limit compression ratio $\epsilon up$ is determined in response to a change of the valve lift.
Figure 6B:
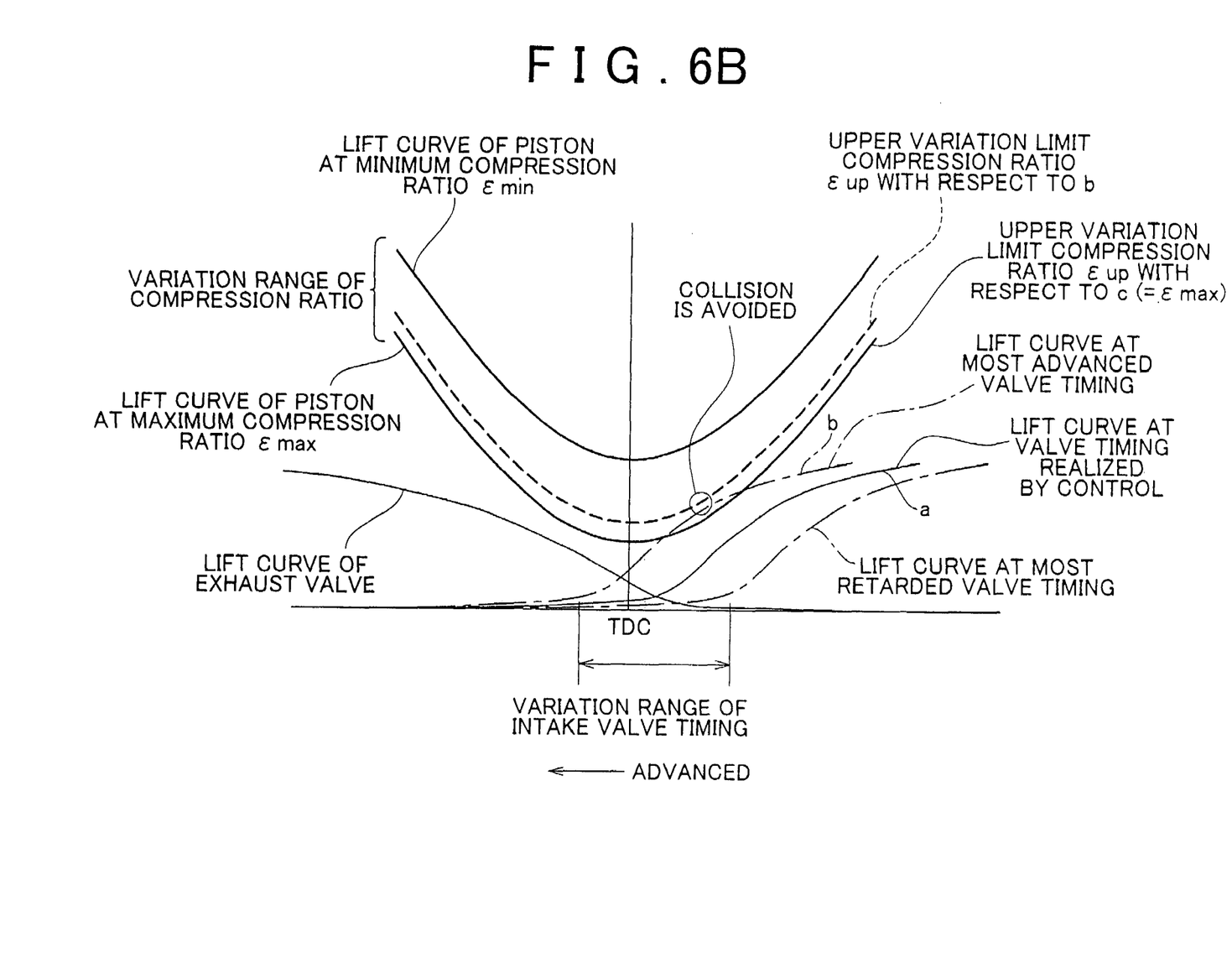

In other words, in step S215, the ECU 60 determines how the valve characteristics are actually controlled by applying the detection signals of the sensors, such as the cam phase sensor 126 and the crank angle sensor 61, to a predetermined map of the valve characteristics. Based on the result of this determination, the ECU 60 then determines the manner of the compression ratio control to be subsequently performed. When it is determined in step S215 that the regular control of the valve characteristics is been performed, the ECU 60 reads in an upper variation limit compression ratio $\epsilon up$ corresponding to the present valve characteristics from a map that defines the upper variation limit compression $\epsilon up$ in relation to the valve characteristics in step S220. The upper variation limit compression ratio $\epsilon up$ is the upper limit of compression ratio at which the intake valves 21, which are subject to the valve characteristics control using the cam mechanism 25, do not collide with the piston 41. FIGS. 6A and 6B are diagrams each illustrating how the upper variation limit compression ratio $\epsilon up$ is determined according to the valve characteristics. More specifically, FIG. 6A illustrates how the upper variation limit compression ratio $\epsilon up$ is determined in response to a change of the valve lift, and FIG. 6B illustrates how the upper variation limit compression ratio $\epsilon up$ is determined in response to a change of the valve timing.

As evident from these diagrams, there is a possibility that the intake valves 21 collide with the piston 41 if the intake valves 21 operate with the maximum valve lift of its variation range or at the most advanced valve timing, which is selectively established by the foregoing valve characteristics control, while the piston 41 is operating at a high compression ratio as controlled by the foregoing compression ratio control. Therefore, the upper variation limit compression ratio $\epsilon up$ is determined according to the valve characteristics so as to avoid such collision between the intake valves 21 and the piston 41. Specifically, by performing the valve characteristics control so as for the valve lift of each intake valve 21 to change as plotted by the lift curve designated by "a" in FIG. 6A, the intake valves 21 are prevented from colliding with the piston 41 even when the piston 41 is operating at a maximum compression ratio $\epsilon max$ of its variation range as controlled in the compression ratio control. Thus, when the intake valves 31 are operating with such valve characteristics, the upper variation limit compression ratio $\epsilon up$ is set to the maximum compression ratio εmax of the variation range of compression ratio. On the other hand, referring to FIG. 6A, when the intake valves 21 are controlled so as for the valve lift of each intake valve 21 to change as plotted by the lift curve designated by "b", which corresponds to the maximum valve lift, or as plotted by the lift curve designated by "c" which is close thereto, the upper variation limit compression ratio εup is set lower than the maximum compression ratio εmax, so that the intake valves 21 operating with the maximum valve lift are prevented from colliding with the piston 41. Note that the same or similar control is performed when the intake valves 21 are operating at an advanced valve timing. In this case, too, the upper variation limit compression ratio εup is determined according to the actual valve characteristics of the intake valves 21 which are realized by the valve characteristics control. That is, the ECU 60 applies the actual valve characteristics to a map that defines the upper variation limit compression ratio εup in relation to the valve characteristics and reads in a corresponding value of the upper variation limit compression ratio εup from the map.

Note that it is sufficient to provide a minimum clearance between the lift curve of the intake valves 21 and the lift curve of the piston 41 to enable the upper variation limit compression ratio εup to be set according to the valve characteristics and thus prevent collision between the intake valves 21 and the piston 41 as described above. However, when determining the value of the minimum clearance, a deviation of the actual lift curve of the piston 41 from the lift curve set in the control, which may occur due to inertia or the like, may be taken into consideration as will described below.

Figure 7:
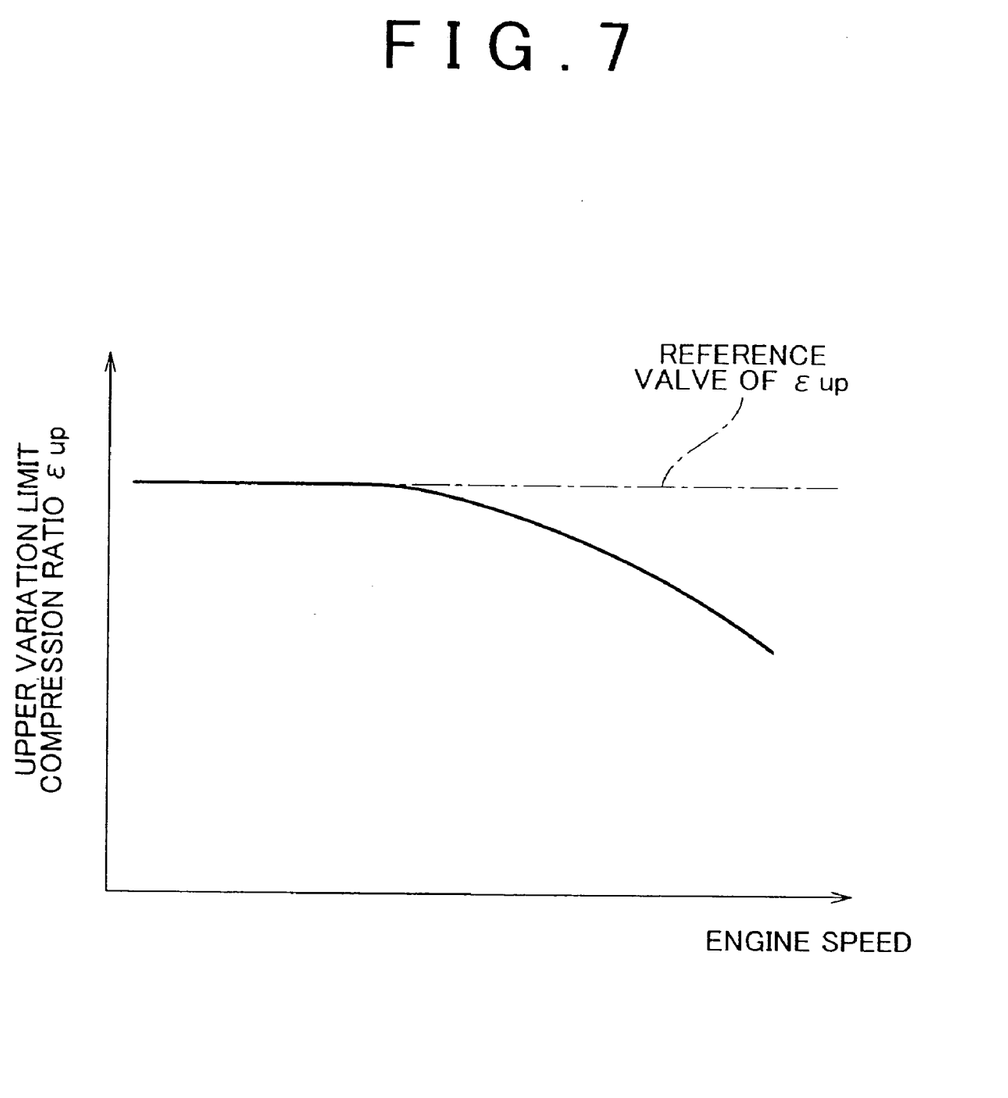
FIG. 7 is a view illustrating the relationship between the upper variation limit compression ratio $\epsilon up$ and the engine speed.

FIG. 7 is a view illustrating the relationship between the upper variation limit compression ratio εup and the engine speed. Referring to FIG. 7, when the engine speed is in the low speed region, the upper variation limit compression ratio εup is set to a value corresponding to the valve characteristics, which is a reference value of the upper variation limit compression ratio Sup, and as the engine speed increases, the upper compression ratio εup is reduced from the reference value of the upper compression ratio εup. That is, in step S220, the ECU 60 reads in an upper variation limit compression ratio εup from the map and then adjusts the value of the upper variation limit compression ratio εup according to the engine speed as shown in FIG. 7, which provides the following advantages.

When the engine is running at a high speed, the inertial force acting on the piston 41 is large due to the high engine speed, and it may therefore increase the possibility that the piston 41 gets closer to and then collides with the intake valves 21. However, by setting the upper variation limit compression ratio εup to a smaller value in response to an increase in the engine speed as shown in FIG. 7, possible collision due to inertial force acting on the piston 41 can be reliably avoided.

Back to the routine, in step S225, the ECU 60 compares the upper variation limit compression ratio εup determined in the aforementioned manner with the target compression ratio εt and determines whether the target compression ratio εt is larger than the upper variation limit compression ratio εup. If it is determined in this step that the target compression ratio εt is larger than the upper variation limit compression ratio εup (i.e., "YES" is obtained), the compression ratio is controlled to the upper variation limit compression ratio sup in step S230. That is, when the target compression ratio εt is larger than the upper variation limit compression ratio εup, the lift curve of the piston 41 obtained at the target compression ratio εt will be below that obtained at the upper variation limit compression ratio εup as viewed in the diagrams of FIGS. 6A, 6B, and therefore the piston 41 will collide with the intake valves 21 if the compression ratio is controlled to the target compression ratio εt. To counter this, when YES is obtained in step S225, the ECU 60 drives and controls the actuator 33 to control the compression ratio to the upper variation limit compression ratio εup, which is smaller than the target compression ratio εt set according to the operation state of the engine. Accordingly, it is possible to prevent the intake valves 21 from colliding with the piston 41 while allowing the compression ratio to increase up to the maximum value of the range where collision does not occur between the intake valves 21 and the piston 41 (i.e., the upper variation limit compression ratio εup), even through the maximum value is smaller than the target compression ratio.

In contrast, if it is determined in step S225 that the target compression ratio εt is equal to or smaller than the upper variation limit compression ratio εup (i.e., "NO" is obtained), the compression ratio is controlled to the target compression ratio εt in step S240. In this case, because the target compression ratio εt is equal to or smaller than the upper variation limit compression ratio εup, the lift curve of the piston 41 obtained at the target compression ratio εt will be above that obtained at the upper compression ratio εup as viewed in the diagrams of FIG. 6A, 6B. Thus, even when the compression ratio is controlled to the target compression ratio εt, collision between the piston 41 and the intake valves 21 does not occur. As such, after NO is obtained in step S225, the ECU 60 drives and controls the actuator 33 so as to achieve the target compression ratio εt corresponding to the operation state of the engine. Accordingly, it is possible to prevent the intake valves 21 from colliding with the piston 41 while allowing the compression ratio to be controlled to the target compression ratio εt corresponding to the operation state of the engine.

Meanwhile, if it is determined in step S215 that the present valve characteristics control is non-regular control, such as the aforementioned control executed at the start of the engine or upon failure of the valve operation, the ECU 60 then reads in an upper variation limit compression ratio εup/em corresponding to the valve characteristics that are most likely to cause collision between the intake valves 21 and the piston 41, i.e., corresponding to one or both of the maximum valve lift and the most advanced valve timing, as shown in FIGS. 6A and 6B, in step S250. The upper variation limit compression ratio εup/em is set so as to prevent the intake valves 21 from colliding with the piston 41 when the intake valves 21 are operating with the valve characteristics most likely to cause the collision.

In step S255, the ECU 60 compares the upper variation limit compression ratio εup/em obtained in the aforementioned manner and the target compression ratio εt. If it is determined in this step that the target compression ratio εt is larger than the upper variation limit compression ratio εup/em (i.e., "YES" is obtained), the ECU 60 then controls the compression ratio to the upper variation limit compression ratio εup/em in step S260. That is, even if the intake valves 21 are controlled to operate with the valve characteristics, which are more likely to cause collision between the intake valves 21 and the piston 41, such collision can be avoided by controlling the compression ratio to the upper variation limit compression ratio sup/em that is smaller than the target compression ratio εt. In this case, it should be also noted that the compression ratio can be increased up to the maximum value of the range where collision does not occur between the intake valves 21 and the piston 41 (i.e., the upper variation limit compression ratio $\epsilon up/em$), even though the upper variation limit compression ratio $\epsilon up/em$ is smaller than the target compression ratio $\epsilon t$.

In contrast, if it is determined in step S255 that the target compression ratio $\epsilon t$ is equal to or smaller than the upper variation limit compression ratio $\epsilon up/em$ (i.e., "NO" is obtained), the ECU 60 then determines a difference between the upper variation limit compression ratio $\epsilon up/em$ and the target compression ratio $\epsilon t$ in step S265, and controls the compression ratio according to the result of the determination as follows. If the determined difference is larger than a predetermined difference $\alpha$, it shows that the target compression ratio $\epsilon t$ is sufficiently smaller than the upper variation limit compression ratio $\epsilon up/em$, and therefore it is considered that collision between the intake valves 21 and the piston 41 will not occur even if the intake valves 21 are controlled to operate with the valve characteristics which are most likely to cause the collision. In this case, therefore, the ECU 60 moves on to step S240 and controls the compression ratio to the target compression ratio $\epsilon t$.

Conversely, if the determined difference between the upper variation limit compression ratio $\epsilon up/em$ and the target compression ratio $\epsilon t$ is equal to or smaller than the predetermined difference $\alpha$, it shows that the target compression ratio $\epsilon t$ is smaller than but is close to the upper variation limit compression ratio $\epsilon up/em$. Therefore, in step S270, the compression ratio is controlled to a value (<the target compression ratio $\epsilon t$) that is smaller than the upper variation limit compression ratio $\epsilon up/em$ by the predetermined difference $\alpha$ in order to reliably prevent the intake valves 21 from colliding with the piston 41.

As described above, in the embodiment, when controlling the valve characteristics of the intake valves 21 and the compression ratio, the upper variation limit compression ratio $\epsilon up$ is set, according to the actual valve characteristics of the intake valves 21 which are realized by the valve characteristics control, to a compression ratio at which the intake valves 21 operating with the same valve characteristics do not collide with the piston 41, as shown in FIG. 6A, 6B (step S220). Then, if the target compression ratio $\epsilon t$ corresponding to the operation state of the engine is larger than the upper variation limit compression ratio $\epsilon up$, the compression ratio is controlled to the upper variation limit compression $\epsilon up$ that is smaller than the target compression ratio $\epsilon t$ in step S230. In this way, collision between the piston 41 and the intake valves 21 can be avoided but the compression ratio can be increased up to the upper variation limit compression ratio $\epsilon up$ which is the maximum value of the range where the collision does not occur, even though the maximum value is smaller than the target compression ratio $\epsilon t$. Thus, it is possible to suppress a decrease in the operation efficiency of the engine 10 while improving the fuel economy.

In contrast, if the target compression ratio $\epsilon t$ is equal to or smaller than the upper variation limit compression ratio $\epsilon up$, the compression ratio is controlled to the target compression ratio $\epsilon t$ in step S240. In this case, it is possible to prevent the intake valves 21 from colliding with the piston 41 while allowing the engine to operate at the target compression ratio $\epsilon t$, so that both of the engine efficiency and fuel economy improve.

In addition, in the embodiment, the compression ratio is also controlled as described below. In the engine main unit 10 of the embodiment, the valve characteristics of the intake valves 21 are changed by the cam mechanism 25 driven the hydraulic actuator. Therefore, at the start of the engine where the temperature of hydraulic fluid is low and therefore the reliability of hydraulic operation of the hydraulic actuator is relatively low, non-regular valve characteristics control, such as the one that limits the variation range of the valve characteristics (i.e., valve lift or valve timing), is performed to ensure a sufficient reliability of the valve characteristics control using the cam mechanism 25. Similarly, when there is an operation failure of the rocker cam 25c or the input arms 25d of the cam mechanism 25 for some reason, non-regular valve control, such as the one that fixes the valve characteristics to predetermined values or states is performed.

When such non-regular control of valve characteristics is performed, the intake valves 21 may be operating with the valve characteristics that are most likely to cause collision between the intake valves 21 and the piston 41 (i.e. maximum valve lift, most advanced valve timing, or both). In this case, therefore, the upper variation limit compression ratio $\epsilon up/em$, which is the upper limit of the variation range of the compression ratio, is determined in step S250 according to the valve characteristics, which are most likely to cause the collision. Since the upper variation limit compression ratio $\epsilon up/em$ is set to a compression ratio at which the intake valves 21 operating with the valve characteristics that are most likely to cause the collision do not collide with the piston 41, if the target compression ratio $\epsilon t$ is larger than the upper variation limit compression ratio $\epsilon up/em$, the compression ratio is controlled to the upper variation limit compression ratio $\epsilon up/em$ which is smaller than the target compression ratio $\epsilon t$ in step S260. Note that the determination of the upper variation limit compression ratio $\epsilon up/em$ in step 250 may be performed on the assumption that the intake valves 21 are operating with the valve characteristics which are most likely to cause collision between the intake valves 21 and the piston 41 (i.e. maximum valve lift, most advanced valve timing, or both), as well as based on the fact that the intake valves 21 are actually operating with such valve characteristics.

In this way, even when the intake valves 21 are controlled to operate with the valve characteristics which are most likely to cause the collision with the piston 41, collision between the intake valves 21 and the piston 41 can be avoided while allowing the compression ratio to be controlled to the upper variation limit compression ratio $\epsilon up/em$ which is the maximum compression ratio of the range of the compression ratio where the collision does not occur. Accordingly, it is possible to suppress a decrease in the operation efficiency of the engine main unit 10 while improving the fuel economy during the non-regular valve characteristics control.

Further, in the embodiment, if the target compression ratio $\epsilon t$ is equal to or smaller than the upper variation limit compression ratio $\epsilon up/em$ during the non-regular valve characteristics control described above and the target compression ratio $\epsilon t$ is close to the upper variation limit compression ratio $\epsilon up/em$, the compression ratio is controlled to a compression ratio which is smaller than the upper variation limit compression ratio $\epsilon$ by the predetermined difference $\alpha$ (step S270), even though it is smaller than the target compression ratio $\epsilon t$. This further increases the reliability in preventing collision between the intake valves 21 and the piston 41.

Further, in the embodiment, during the non-regular valve characteristics control, if the target compression ratio $\epsilon t$ is sufficiently smaller than the upper variation limit compression ratio $\epsilon up/em$ and therefore it is considered that the intake valves 21 do not collide with the piston 41, the compression ratio is controlled to the target compression ratio εt despite the fact or assumption that the intake valves 21 are operating with the valve characteristics which are most likely to cause collision between the intake valves 21 and the piston 41. In this case, it is possible to improve both the operation efficiency of the engine and the fuel economy.

The exemplary embodiment of the invention has been described. However, the invention is not limited to the aforementioned embodiment, and may be embodied in various other forms and structures within the scope of the invention. For example, in the foregoing embodiment, the engine includes the cam mechanism 25 that changes the valve characteristics of the intake valves 21, but the invention may be applied to an engine in which such valve characteristics control is performed, additionally or alternatively, to exhaust valves.

Further, in the embodiment, the capacity of the combustion chamber is changed by changing the relative positional relationship between the upper block 31 and the lower block 32. However, the invention is not limited to this structure. For example, the connecting rod 42 connecting the piston 41 and the crankshaft 43 may be a connecting rod having a pivot structure, and the piston stroke may be changed by changing the pivoting angle of the connecting rod 42 so as to change the capacity of the combustion chamber and the compression ratio as needed.

Further, in the foregoing embodiment, the target compression ratio εt is limited to the upper compression ratio εup or the upper variation limit compression ratio εup/em in steps S220 to S230 or step S250 to s270 in accordance with the state of the valve characteristics control detected in step S215. Alternatively, two or more maps may be selectively used to determine a target compression ratio. For example, two or more compression ratio maps (upper-limit maps) each defining a target compression ratio within a range up to the upper variation limit compression ratio εup or to the upper compression ratio εup/em in relation to the operation state of the engine and the valve characteristics may be prepared in advance and selectively used to determine a target compression ratio.

What is claimed is:

1. An internal combustion engine comprising:
   a combustion chamber;
   a piston;
   an intake valve;
   an exhaust valve;
   a variable compression ratio mechanism that changes a compression ratio by changing a capacity of the combustion chamber;
   a compression ratio control portion that controls the variable compression ratio mechanism so as to achieve a target compression ratio determined according to an operation state of the internal combustion engine;
   a variable valve characteristics mechanism that changes valve characteristics of at least one of the intake valve and the exhaust valve;
   a variable valve control portion that controls the variable valve characteristics mechanism so as to achieve target valve characteristics of the at least one of the intake valve and the exhaust valve that are determined according to an operation state of the internal combustion engine; and
   a compression ratio limit portion that determines an upper variation limit compression ratio that is an upper limit of compression ratio at which the at least one of the intake valve and the exhaust valve does not collide with the piston, according to actual valve characteristics of the at least one of the intake valve and the exhaust valve that are realized by the variable valve characteristics mechanism being controlled by the variable valve control portion, and limits the target compression ratio to the upper variation limit compression ratio when the target compression ratio is larger than the upper variation limit compression ratio.

2. The internal combustion engine according to claim 1, further comprising:
   a valve characteristics limiting portion that limits a control of the valve characteristics of the at least one of the intake valve and the exhaust valve that is performed by the variable valve control portion when an operation failure of the at least one of the intake valve and the exhaust valve occurs,
   wherein the compression ratio limiting portion determines the upper variation limit compression ratio according to the valve characteristics determined by the limited control of the valve characteristics limiting portion when the valve characteristics limiting portion is limiting the control of the valve characteristics by the variable valve control portion.

3. The internal combustion engine according to claim 2, wherein the compression ratio limiting portion determines the upper variation limit compression ratio according to a state of the operational failure.

4. The internal combustion engine according to claim 2, wherein, when the valve characteristics limiting portion performs the limited control of the valve characteristics, the compression ratio limiting portion determines the upper variation limit compression ratio according to predetermined valve characteristics that are likely to cause collision between the at least one of the intake valve and the exhaust valve and the piston.

5. The internal combustion engine according to claim 4, wherein the predetermined valve characteristics correspond to at least one of the most advanced valve timing and a maximum valve lift of the at least one of the intake valve and the exhaust valve.

6. The internal combustion engine according to claim 2, wherein the compression ratio limiting portion limits the target compression ratio to a value obtained by subtracting a predetermined value from the upper variation limit compression ratio when a difference between the target compression ratio and the upper variation limit compression ratio is smaller than the predetermined value.

7. The internal combustion engine according to claim 1, further comprising:
   a valve characteristics limiting portion that limits a control of the valve characteristics of the at least one of the intake valve and the exhaust valve that is performed by the variable valve control portion when the internal combustion engine is operating in a predetermined operation state,
   wherein the compression ratio limiting portion determines the upper variation limit compression ratio according to the valve characteristics determined by the limited control of the valve characteristics limiting portion when the valve characteristics limiting portion is limiting the control of the valve characteristics.

8. The internal combustion engine according to claim 1, further comprising:
   a valve characteristics limiting portion that limits a control of the valve characteristics of the at least one of the intake valve and the exhaust valve that is performed by the variable valve control portion when the internal combustion engine is operating in a predetermined operation state and when an operational failure of the at least one of the intake valve and the exhaust valve occurs, wherein the compression ratio limiting portion determines the upper variation limit compression ratio according to the valve characteristics determined by the limited control of the valve characteristics limiting portion when the valve characteristics limiting portion is limiting the control of the valve characteristics.

9. The internal combustion engine according to claim 1, wherein the upper variation limit compression ratio is reduced as an engine speed of the internal combustion engine increases.

10. The internal combustion engine according to claim 1, wherein the variable compression ratio mechanism changes the compression ratio by moving an upper block of a cylinder block of the internal combustion engine relative to a lower block of the cylinder block of the internal combustion engine in a direction that the piston reciprocates.

11. The internal combustion engine according to claim 1, wherein the target compression ratio is increased as a torque required of the internal combustion engine decreases.

12. An internal combustion engine comprising:
a combustion chamber;
a piston;
an intake valve;
an exhaust valve;
variable compression ratio means for changing a compression ratio by changing a capacity of the combustion chamber;
compression ratio control means for controlling the variable compression ratio mechanism so as to achieve a target compression ratio determined according to an operation state of the internal combustion engine;
variable valve characteristics means for changing valve characteristics of at least one of the intake valve and the exhaust valve;
variable valve control means for controlling the variable valve characteristics means so as to achieve target valve characteristics of the at least one of the intake valve and the exhaust valve that are determined according to an operation state of the internal combustion engine; and
compression ratio limit means for determining an upper variation limit compression ratio that is an upper limit of the compression ratio at which the at least one of the intake valve and the exhaust valve does not collide with the piston, according to actual valve characteristics of the at least one of the intake valve and the exhaust valve that are realized by the variable valve characteristics means being controlled by the variable valve control means, and limiting the target compression ratio to the upper variation limit compression ratio when the target compression ratio is larger than the upper variation limit compression ratio.

13. A method for operating an internal combustion engine, comprising:
changing a compression ratio by changing a capacity of a combustion chamber so as to achieve a target compression ratio determined according to an operation state of the internal combustion engine;
changing valve characteristics of at least one of an intake valve and an exhaust valve so as to achieve target valve characteristics determined according to an operation state of the internal combustion engine;
determining an upper variation limit compression ratio that is an upper limit of compression ratio at which the at least one of the intake valve and the exhaust valve does not collide with a piston, according to the changed valve characteristics of the at least one of the intake valve and the exhaust valve; and
limiting the target compression ratio to the upper variation limit compression ratio when the target compression ratio is larger than the upper variation limit compression ratio.

14. The method according to claim 13, further comprising:
limiting a control of the valve characteristics when an operational failure of the at least one of the intake valve and the exhaust valve occurs, wherein
when the control of valve characteristics is limited, the upper variation limit compression ratio is determined according to the valve characteristics determined by the limited control.

15. The method according to claim 13, wherein the upper variation limit compression ratio is determined according to a state of the operational failure.

16. The method according to claim 13, wherein, when the control of valve characteristics is limited, the upper variation limit compression ratio is determined according to predetermined valve characteristics which are likely to cause collision between the at least one of the intake valve and the exhaust valve and the piston.

17. The method according to claim 16, wherein the predetermined valve characteristics correspond to at least one of the most advanced valve timing and a maximum valve lift of the at least one of the intake valve and the exhaust valve.

18. The method according to claim 16, wherein the upper variation limit compression ratio is reduced as an engine speed of the internal combustion engine increases.

19. The method according to claim 13, wherein the target compression ratio is limited to a value obtained by subtracting a predetermined value from the upper variation limit compression ratio when a difference between the target compression ratio and the upper variation limit compression ratio is smaller than the predetermined value.

* * * * *

UNITED STATES PATENT AND TRADEMARK OFFICE
CERTIFICATE OF CORRECTION

PATENT NO. : 7,278,383 B2 Page 1 of 1
APPLICATION NO. : 11/589173
DATED : October 9, 2007
INVENTOR(S) : Eiichi Kamiyama et al.

It is certified that error appears in the above-identified patent and that said Letters Patent is hereby corrected as shown below:

| Column | Line | |
|--------|------|---|
| 9 | 38 | Change "Sup" to --εup--. |
| 9 | 64 | Change "sup" to --εup--. |
| 10 | 63 | Change "sup" to --εup--. |

Signed and Sealed this

Eighth Day of July, 2008

JON W. DUDAS
*Director of the United States Patent and Trademark Office*